(12) United States Patent
Chessell

(10) Patent No.: US 6,631,395 B1
(45) Date of Patent: Oct. 7, 2003

(54) APPARATUS, METHOD AND COMPUTER PROGRAM PRODUCT FOR CLIENT/ SERVER COMPUTING WITH PROGRAMMABLE ACTION BY TRANSACTION COORDINATOR DURING PREPARED STATE

(75) Inventor: Amanda Elizabeth Chessell, Alton (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/065,345

(22) Filed: Apr. 23, 1998

(30) Foreign Application Priority Data

Mar. 19, 1998 (GB) ............................................. 9805777

(51) Int. Cl.[7] .................................................. G06F 9/00
(52) U.S. Cl. ...................................... 709/101; 707/200
(58) Field of Search ................................ 709/200–203, 709/101, 328, 220, 226, 318; 707/103, 200–206

(56) References Cited

U.S. PATENT DOCUMENTS 5,440,744 A * 8/1995 Jacobson et al. ........... 709/203
5,857,188 A * 1/1999 Douglas ........................ 707/9
5,956,489 A * 9/1999 Andres et al. ............... 709/221
5,956,506 A * 9/1999 Cobb et al. .................. 709/101

FOREIGN PATENT DOCUMENTS

| EP | 0567999 | 11/1993 |
| EP | 0578406 | 1/1994 |
| GB | 2288477 | 10/1995 |
| GB | 2303474 A | 2/1997 |

* cited by examiner

Primary Examiner—St. John Courtenay, III
Assistant Examiner—Van Hoa Nguyen
(74) Attorney, Agent, or Firm—Jeanine S. Ray-Yarletts

(57) ABSTRACT

A server for use in a client/server computing system which coordinates the processing of distributed transactions in the client/server computing system, the server has: a means for sending requests for votes to each resource which has been called by the server to take part in a distributed transaction; a means for receiving votes from each resource in response to having sent requests for votes; a means for determining whether any of the resources has thrown an exception instead of returning a vote; and a means for assigning a programmed direction as a vote to a resource which has thrown an exception to complete the transaction if it is determined that a resource has thrown an exception instead of returning a vote.

10 Claims, 3 Drawing Sheets

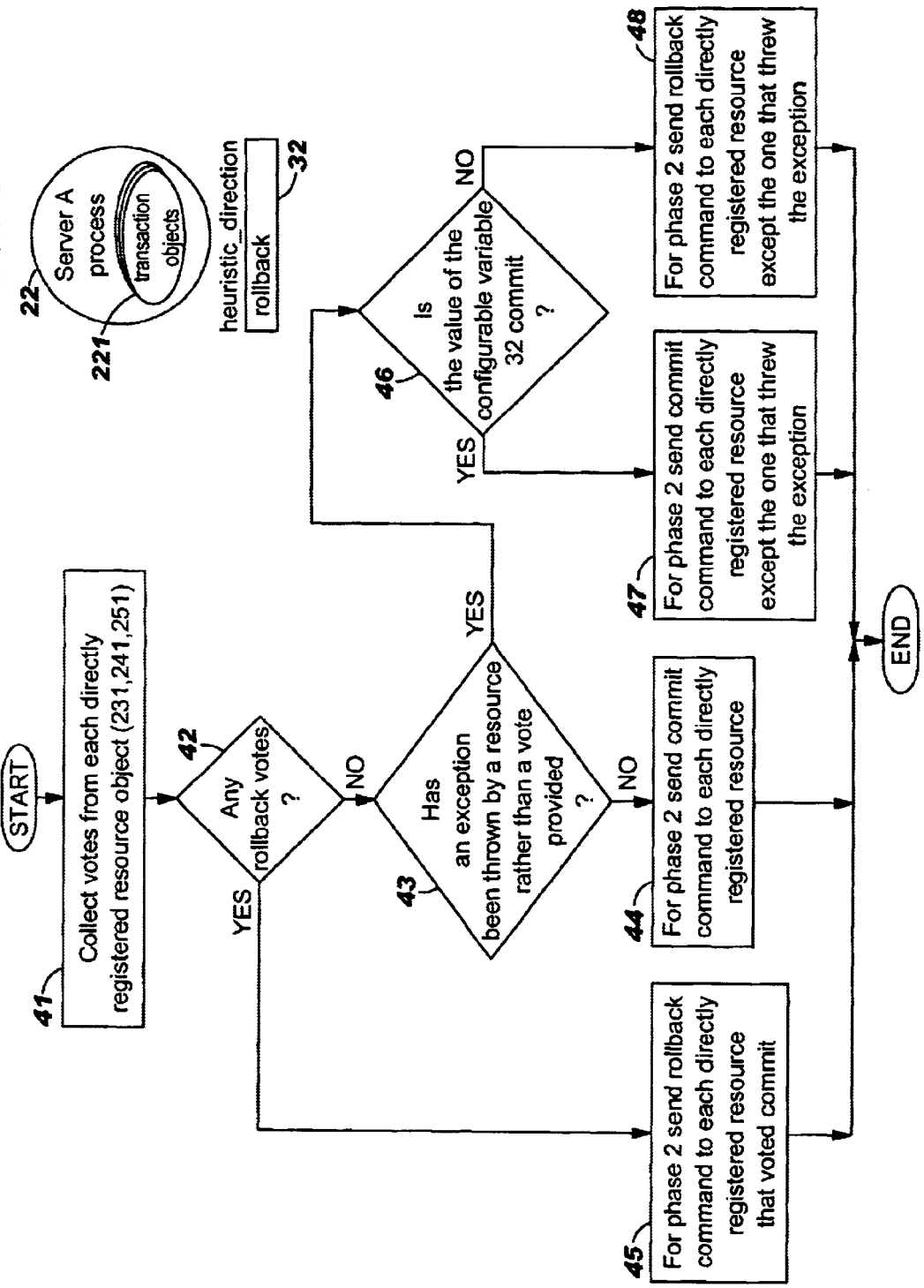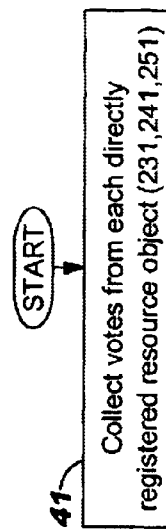

APPARATUS, METHOD AND COMPUTER PROGRAM PRODUCT FOR CLIENT/ SERVER COMPUTING WITH PROGRAMMABLE ACTION BY TRANSACTION COORDINATOR DURING PREPARED STATE

FIELD OF THE INVENTION

The invention relates to the field of client/server (also known as "distributed") computing, where one computing device ("the client") requests another computing device ("the server") to perform part of the client's work. The client and server can also be both located on the same physical computing device.

BACKGROUND OF THE INVENTION

Client/server computing has become more and more important over the past few years in the information technology world. This type of distributed computing allows one machine to delegate some of its work to another machine that might be, for example, better suited to perform that work. For example, the server could be a high-powered computer running a database program managing the storage of a vast amount of data, while the client is simply a desktop personal computer (PC) which requests information from the database to use in one of its local programs.

The benefits of client/server computing have been even further enhanced by the use of a well-known computer programming technology called object-oriented programming (OOP), which allows the client and server to be located on different (heterogeneous) "platforms". A platform is a combination of the specific hardware/software/operating system/communication protocol which a machine uses to do its work. OOP allows the client application program and server application program to operate on their own platforms without worrying how the client application's work requests will be communicated and accepted by the server application. Likewise, the server application does not have to worry about how the OOP system will receive, translate and send the server application's processing results back to the requesting client application.

Details of how OOP techniques have been integrated with heterogeneous client/server systems are explained in U.S. Pat. No. 5,440,744 and European Patent Published Application No. EP 0 677,943 A2. These latter two publications are hereby incorporated by reference. However, an example of the basic architecture will be given below for contextual understanding of the invention's environment.

As shown in FIG. 1, the client computer 10 (which could, for example, be a personal computer having the IBM OS/2 operating system installed thereon) has an application program 40 running on its operating system ("IBM" and "OS/2" are trademarks of the International Business Machines corporation). The application program 40 will periodically require work to be performed on the server computer 20 and/or data to be returned from the server 20 for subsequent use by the application program 40. The server computer 20 can be, for example, a high-powered mainframe computer running on IBM's MVS operating system ("MVS" is also a trademark of the IBM corp.). For the purposes of the present invention it is irrelevant whether the requests for communications services to be carried out by the server are instigated by user interaction with the first application program 40, or whether the application program 40 operates independently of user interaction and makes the requests automatically during the running of the program.

When the client computer 10 wishes to make a request for the server computer 20's services, the first application program 40 informs the first logic means 50 of the service required. It may for example do this by sending the first logic means the name of a remote procedure along with a list of input and output parameters. The first logic means 50 then handles the task of establishing the necessary communications with the second computer 20 with reference to definitions of the available communications services stored in the storage device 60. All the possible services are defined as a cohesive framework of object classes 70, these classes being derived from a single object class. Defining the services in this way gives rise to a great number of advantages in terms of performance and reusability.

To establish the necessary communication with the server 20, the first logic means 50 determines which object class in the framework needs to be used, and then creates an instance of that object at the server, a message being sent to that object so as to cause that object to invoke one of its methods. This gives rise to the establishment of the connection with the server computer 20 via the connection means 80, and the subsequent sending of a request to the second logic means 90.

The second logic means 90 then passes the request on to the second application program 100 (hereafter called the service application) running on the server computer 20 so that the service application 100 can perform the specific task required by that request, such as running a data retrieval procedure. Once this task has been completed the service application may need to send results back to the first computer 10. The server application 100 interacts with the second logic means 90 during the performance of the requested tasks and when results are to be sent back to the first computer 10. The second logic means 90 establishes instances of objects, and invokes appropriate methods of those objects, as and when required by the server application 100, the object instances being created from the cohesive framework of object classes stored in the storage device 110.

Using the above technique, the client application program 40 is not exposed to the communications architecture. Further the service application 100 is invoked through the standard mechanism for its environment; it does not know that it is being invoked remotely.

The Object Management Group (OMG) is an international consortium of organizations involved in various aspects of client/server computing on heterogeneous platforms with distributed objects as is shown in FIG. 1. The OMG has set forth published standards by which client computers (e.g. 10) communicate (in OOP form) with server machines (e.g. 20). As part of these standards, an Object Request Broker (called CORBA—the Common Object Request Broker Architecture) has been defined, which provides the object-oriented bridge between the client and the server machines. The ORB decouples the client and server applications from the object oriented implementation details, performing at least part of the work of the first and second logic means 50 and 90 as well as the connection means 80.

As part of the CORBA software structure, the OMG has set forth standards related to "transactions" and these standards are known as the OTS or Object Transaction Service. See, e.g., CORBA Object Transaction Service Specification 1.0, OMG Document 94.8.4. Computer implemented transaction processing systems are used for critical business tasks in a number of industries. A transaction defines a single unit of work that must either be fully completed or fully purged without action. For example, in the case of a bank automated teller machine from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and the actual occurrences.

Distributed transaction processing involves a transaction that affects resources at more than one physical or logical location. In the above example, a transaction affects resources managed at the local automated teller device as well as bank balances managed by a bank's main computer. Such transactions involve one particular client computer (e.g, 10) communicating with one particular server computer (e.g., 20) over a series of client requests which are processed by the server. The OMG's OTS is responsible for co-ordinating these distributed transactions.

Usually, an application running on a client process begins a transaction which may involve calling a plurality of different servers, each of which will initiate a server process to make changes to its local database according to the instructions contained in the transaction. The transaction finishes by either committing the transaction (and thus all servers finalize the changes to their local databases) or aborting the transaction (and thus all servers "rollback" or ignore the changes to their local databases). To communicate with the servers during the transaction (e.g., instructing them to either commit or abort their part in the transaction) one of the processes involved must maintain state data for the transaction. This usually involves the process to set up a series of transaction state objects, one of which is a Coordinator object which coordinates the transaction with respect to the various server processes.

The basic software architecture involved in providing an implementation of the OTS is shown in FIG. 2. A client process 21 which wants to begin a transaction (e.g., to withdraw money from a bank account) locates a process which is capable of creating and holding the transaction objects that will maintain the state of the transaction. As the modern tendency is to create clients that are "thin" (and thus have only the minimum functionality), the client process 21 will usually not be able to maintain the transaction objects locally and must look for a server process for this purpose.

The OTS (or another service, such as the CORBA Lifecycle service) selects server A process 22 on which to create the transaction state objects 221 (which include the Coordinator object, Control object and Terminator object). Upon locating the server A process 22, client process 21 sends (arrow with encircled number 1) a message to server A process 22 to instruct server A process 22 to create the transaction state objects 221. The Control object (known in the OTS as CosTransactions::Control) provides access to the other two transaction state objects. The Terminator object (known in the OTS as CosTransactions::Terminator) is used to end the transaction. The Coordinator object (known in the OTS as CosTransactions::Coordinator) maintains a list, in local storage 222, of resource objects (known in the OTS as CosTransactions::Resource) that have made updates to their respective data during the transaction. This list is required so that the Coordinator object can consistently call the resource objects at the end of the transaction to command them to commit their transactional changes (make their local data changes final) or to rollback such changes (bring the local data back to the state it was in before the transaction started). A rollback would be necessary, for example, where the transaction could not finish because one of the resources was not working properly.

Server A process 22 then creates the transaction state objects 221 and sends a reply (arrow with encircled number 2) containing the transaction context to client 21. Client 21 then sends, for example, a debit bank account command (arrow with encircled number 3) to server B process 23 (the process containing the resource, for example, bank account, object 231 which the client process 21 wishes to withdraw money from). This latter command carries with it the transaction context supplied to the client 21 by the server A process 22. In this way, the resource object 231 in process 23 can register itself (arrow with encircled number 4) with the transaction objects 221 in process 22 so that the resource object 231 can be commanded (arrow with encircled number 5) to commit or rollback by the transaction state objects 221 at the end of the transaction.

In the above operation, when the transaction state objects 221 are created, they must log information about themselves and the transaction they represent in local storage 222, so that the transaction will be recoverable in case of a server failure which temporarily prevents the server A process 22 from continuing with the transaction.

As part of the transaction, the client process 21 then makes similar calls to server C process 24 (to access the resource object 241) and server D process 24 (to access the resource object 251). Server B process 23, in carrying out its part of the transaction, may need to call another server process, such as server E process 26, to access the resource objects 261, 262 and 263 located in process 26.

Since the number of server processes and resources involved in FIG. 2 is becoming large, the need for careful synchronization of all of the database changes involved becomes readily apparent. The usual way to go about achieving this synchronization is to carry out a two-phase commit process when the client 21 issues a command to end the transaction. The transaction objects 221 first command (phase 1) each of their directly registered resources (231, 241 and 251 in the FIG. 2 example) to prepare to commit their database changes. Phase 1 is also known as the prepare stage of a transaction, as the resources are being prepared for the finalization of their data changes, which will take place in phase 2. Each of these resources then responds to the transaction objects 221 to indicate that it has prepared to commit its changes, and the resources will not allow any more changes to be made to the databases. This response is, in effect, a vote, signifying that this particular resource is voting that the transaction should be committed. After issuing their votes, the resources are then said to be sitting "in doubt" (also known as in a "prepared" state) waiting for the transaction objects 221 to give a synchronized final command (phase 2) to commit all database changes made during the transaction. This latter final command is only given if all resources have voted that the transaction should be committed. Server B process 23, which has called another server process 26, would carry out its own two-phase commit protocol with respect to the resource objects 261, 262, and 263, as part of its participation in the main two-phase commit protocol discussed above. That is, server B process 23 would send a prepare command to its directly registered resources 261, 262 and 263, and receive a vote from each of them, before server B process 23 sends a consolidated reply to server A process 22.

Rather than voting that a transaction be committed, a resource can also vote that a transaction should be rolled back. A rollback vote would be issued by a resource if that resource had a problem while making its data changes during the transaction (e.g., some type of write error had occurred while a resource was making a local data change).

The receipt of a rollback vote from at least one resource will cause the transaction objects 221 to rollback the entire transaction. This is in keeping with the fact that a transaction is an all or nothing prospect: either all resource changes in a transaction are committed or none are.

The newer version of the CORBA specification, CORBA Services: Common Object Services Specification Transaction Service v1.1, December 1996, introduces two new responses that a resource can provide to the transaction objects 221 during the prepare stage. These two new responses are not votes but are instead called "exceptions". When a resource issues an exception in place of a vote, the resource is said to have "thrown an exception". The first exception is:

CosTransactions::HeuristicHazard

The second exception is:

CosTransactions::HeuristicMixed

The nature of these two exceptions will now be described.

While the transaction outcome is unknown, resource objects are holding locks to their respective database resources, so no other transaction can access such resources until the two-phase commit protocol is completed in the server process where the resources reside. Should this take an unreasonably long time to complete for some reason, the locked data will be unavailable for a long time. As locking data for an extended period of time can often work a severe hardship in many servers (due to the fact that no other transaction can have access to the server resources), a systems administrator of a server holding resource objects is often given the authority to make a guess (called an heuristic decision) as to how the transaction will turn out, should the server be left incomplete for a long period of time. This way, the resource can release its locks before the second phase of the two-phase commit has completed so that another transaction can have access to the resource's associated data. If the guess turns out to be right, then everything is fine, however, if the guess turns out to be wrong, then a condition known as heuristic damage has occurred.

For example, assume that resource objects 262 and 263 have taken heuristic decisions to rollback a transaction and resource object 261 has taken an heuristic decision to commit the transaction because the transaction has been running for an unreasonably long period of time. This situation causes resource object 231 to throw the exception HeuristicMixed, since some of resource object's subordinate resource objects (i.e., 262 and 263) have heuristically rolled back, while another (i.e., 261) has heuristically committed.

Resource object 231 would instead throw the exception HeuristicHazard back to the transaction objects 221 in a situation where the resource object 231 does not know what its subordinates (i.e., 261, 262 and 263) have done, because they are not answering when the resource object 231 calls them to determine their status. In this case, the server 26 containing these resources may have gone down (as a result of, for example, a thunderstorm).

When the transaction objects 221 in the server A process 22 receives one of these exceptions from their directly registered resource object 231 during the prepare stage, it is now clear that the transaction cannot proceed successfully. However, the CORBA specification provides no guidance or suggestion as to how the transaction objects 221 should respond with respect to the other directly registered resource objects 241 and 251 when a directly registered resource object 231 throws one of these two new exceptions. Resource objects 241 and 251 are still holding locks. The transaction objects 221 must send some command to them so that they can release their locks and thus free themselves up for use by another transaction. However, it is not apparent how the transaction objects 221 should go about deciding how to deal with these resource objects 241 and 251 when an exception has been thrown by resource object 231.

SUMMARY OF THE INVENTION

According to a first aspect, the present invention provides a server for use in a client/server computing system which coordinates the processing of distributed transactions in the client/server computing system, the server has: a means for sending requests for votes to each resource which has been called by the server to take part in a distributed transaction; a means for receiving votes from each resource in response to having sent requests for votes; a means for determining whether any of the resources has thrown an exception instead of returning a vote; and a means for assigning a programmed direction to a resource which has thrown an exception as a vote to complete the transaction if it is determined that a resource has thrown an exception instead of returning a vote.

Preferably, the following of the programmed direction involves one of two options, with a corresponding option being chosen depending on the value of the programmed direction: (1) assigning a vote of commit if the programmed direction is commit and (2) assigning a vote of rollback if the programmed direction is rollback.

Further preferably, the means for following consults a configurable variable to determine the programmed direction.

Further preferably, the exception indicates that a resource cannot determine the status of its subordinate resources or the exception indicates that at least one of a resource's subordinate resources has taken an heuristic decision to commit and at least one of a resource's subordinate resources has taken an heuristic decision to rollback.

In the preferred embodiment, the client/server computing system is heterogenous, object-oriented and conforms to the Common Object Request Broker's Object Transaction Service standard.

According to a second aspect, the invention provides a method of carrying out the functionality of the server described above in the first aspect.

According to a third aspect, the invention provides a computer program product stored on a computer readable storage medium for, when run on a computer, carrying out the functionality of the first aspect.

Thus, with the present invention, transaction objects in a server process coordinating a distributed transaction are given efficient and effective guidance concerning the steps which should be taken in the event of receiving a thrown exception from a resource object while the transaction is in the prepare state. Further, since the server process coordinating the distributed transaction can be programmed to follow a certain course when faced with an exception, the course can be tailored to best suit the type of transaction. For example, for an on-line banking transaction, it may be better to rollback the entire transaction if an exception is thrown (to avoid incorrectly debiting/crediting a customer's bank account balance), while for an order entry transaction, it may be better to commit (to avoid making customers re-enter data).

BRIEF DESCRIPTION OF THE DRAWINGS

The invention will be better understood by the below description of preferred embodiments thereof to be read while referring to the following figures.

FIG. 3 is a block diagram showing an implementation according to a preferred embodiment of the present invention; and FIG. 4 is a flowchart showing the steps which take place within a server process according to the preferred embodiment of the present invention.

DETAILED DESCRIPTION OF THE PREFERRED EMBODIMENTS

The Common Object Request Broker (CORBA) Object Transaction Service (OTS) supplies an interface object known as "Current" which has a "begin" method used by client application programs (source code) running in a client process 21 (see FIG. 2) to signal a beginning of a transaction. When the client application is being built or executed on a particular client architecture and contains the "begin" method, the underlying OTS software will proceed (as described above with respect to the prior art) to create the transaction by setting up the transaction objects 221 in a server process 22.

Figure 1:
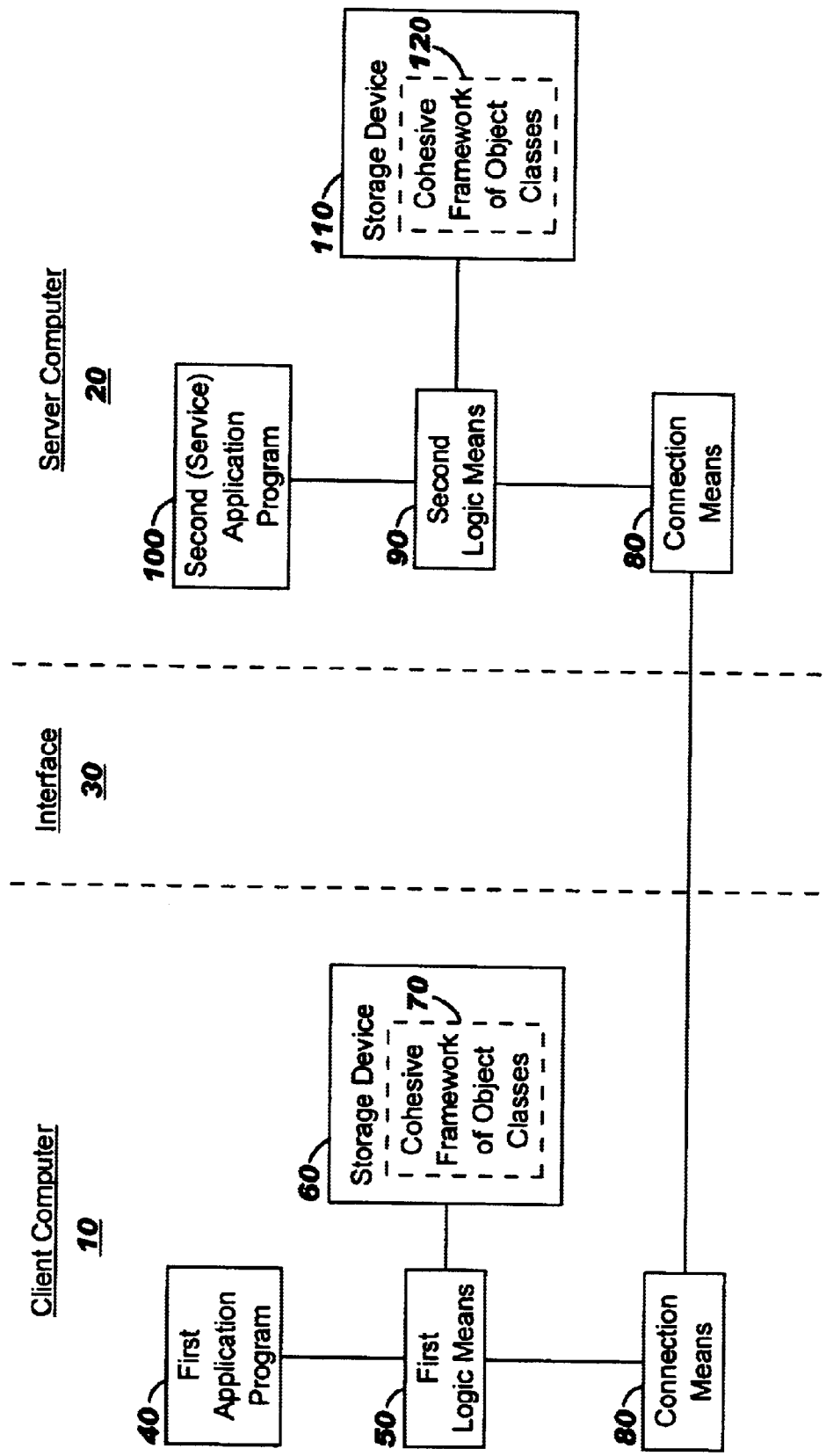
FIG. 1 is a block diagram of a well-known heterogeneous client/server architecture using object technology, in the context of which preferred embodiments of the present invention can be applied.
Figure 2:
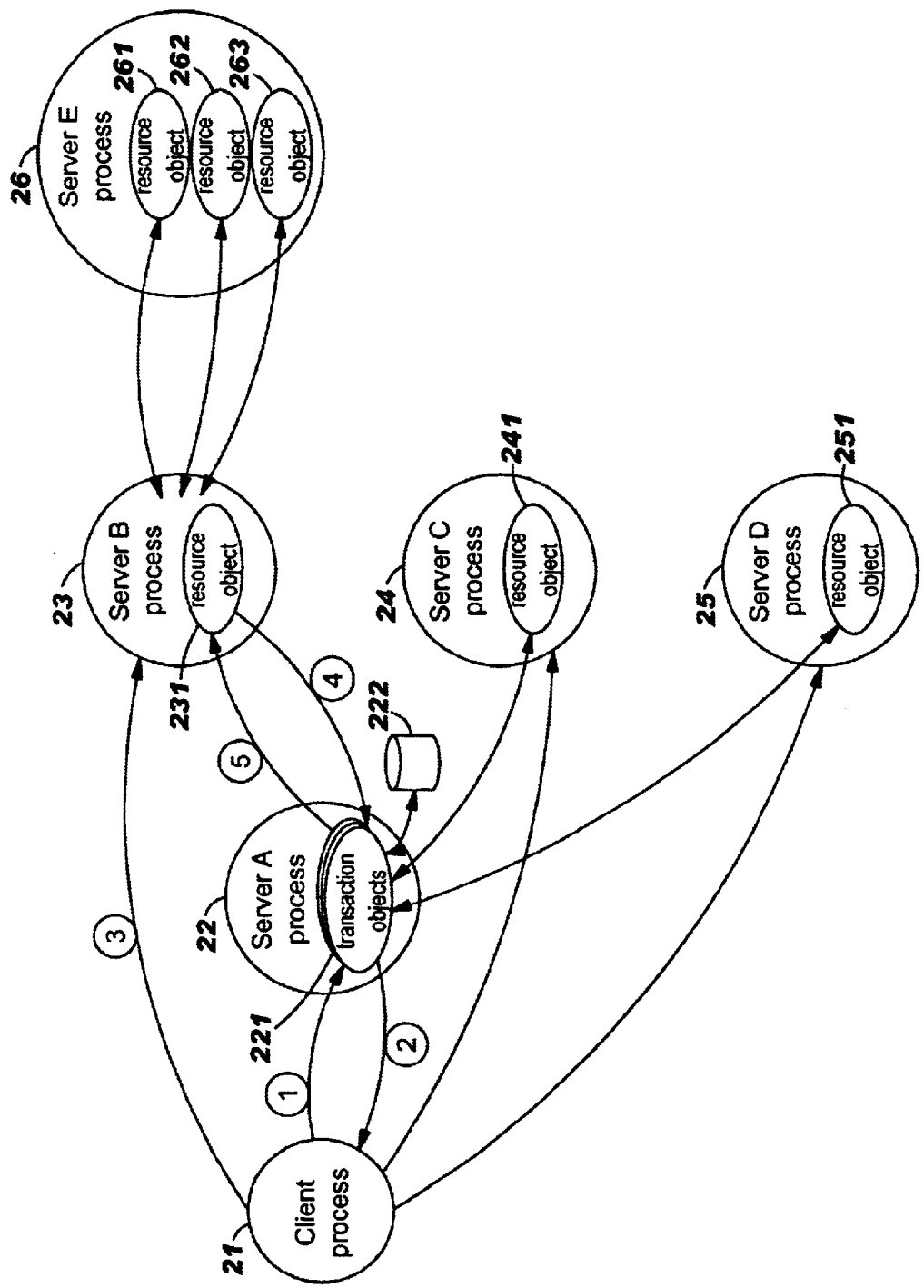
FIG. 2 is a block diagram showing an implementation of an object-based transaction service implementation used in explaining both the prior art and the preferred embodiment of the present invention.

The preferred embodiment of the present invention will now be described, using the example architecture of FIG. 2 as a model. As was described above, the resources 231, 241 and 251 of server B process 23, server C process 24 and server D process 25, respectively, are directly registered with the transaction objects 221. Server B process 23 has called resource objects 261, 262 and 263, in server E process 26, so resource objects 261, 262 and 263 are registered directly with server B process 23.

The server running server E process 26 has now lost power, perhaps due to a local thunderstorm. Resource object 231, therefore, cannot establish communication with its subordinate resources 261, 262 and 263.

The transaction objects 221 in server A process 22 send a request to their directly registered resource object 231 to obtain a vote for that resource object (such a vote incorporating the status from each subordinate resource object 261, 262 and 263 which are registered directly with the server process 23). In reply, the resource object 231 throws the HeuristicHazard exception, since the resource object 231 cannot determine the status of its subordinate resources.

Meanwhile, the other two directly registered resource objects 241 and 251 have also been issued requests to vote and, in reply, have both issued to the transaction objects 221 votes to commit, as the local data changes in server processes 24 and 25 have run smoothly without any failure.

Now, the transaction objects 221 must decide how to next proceed to finish the transaction. It is clear that the transaction will not finish successfully, because of the receipt of the exception from resource object 231. The problem that must be addressed here is how to best proceed to inform resource objects 241 and 251 that they may be removed from their uncertain state and thus free their locks so that another transaction can use their resources.

According to the preferred embodiment of the present invention, a configurable variable 32 (see FIG. 3) called heuristic_direction is assigned to server A process 22. This variable has been programmed by the systems administrator to assume either the value "rollback" or the value "commit". This configurable variable 32 is used by the server A process 22 to determine which vote to assign to the resource 231 and this is used to determine which command to send to directly registered resource objects 241 and 251 which are sitting in doubt, as will be described below in conjunction with the flowchart of FIG. 4.

The client process 21 that is orchestrating the transaction decides that the transaction is now finished and thus informs the transaction objects 221 in server A process 22 that the two phase commit protocol should be started. The transaction objects 221 then send a request for votes to each directly registered resource object 231, 241 and 251. The transaction objects then collect (step 41) votes received from each directly registered resource object 231, 241 and 251. At step 42, the transaction objects 221 determine whether any rollback votes have been received from any of the directly registered resources 231, 241 or 251. If any of the directly registered resource objects 231, 241 or 251 has voted to rollback the transaction, then the entire transaction must be rolled back, thus, during phase 2, the transaction objects 221 send (step 45) rollback commands to each directly registered resource that voted commit. However, if no rollback votes have been returned, control flows to step 43 where the transaction objects 221 determine whether any of the directly registered resource objects 231, 241 or 251 has thrown an exception rather than returned a vote.

If one of the directly registered resources (i.e., 231) throws an exception (e.g., the HeuristicHazard exception, using the example described above where server 26 goes down) and there have been no rollback votes, control flows to step 46 where server A process 22 determines the value of the configurable variable 32. If the value of this variable is "commit", then control flows to step 47 where, in phase 2, the transaction objects 221 send commit commands to each of the directly registered resources 241 and 251 that are still in doubt (the ones that did not throw an exception). This will free the locks on such resources, making the resources available for use by another transaction. If the value of the variable is "rollback", then control flows to step 48 where, in phase 2, the transaction objects 221 send rollback commands to each of the directly registered resources 241 and 251 that are still in doubt (the ones that did not throw an exception). This will free the locks on such resources, making the resources available for use by another transaction.

If, at step 43, no exception has been thrown, then, during phase 2, the transaction objects 221 send commit commands (step 44) to each directly registered resource object 231, 241 and 251. This is the normal case which most transactions will follow.

The thrown exception determined at step 43 could be the HeuristicMixed exception rather than the HeuristicHazard exception. For example, if the server E process had taken heuristic decisions in different directions for its three resource objects (e.g., resource object 261 has rolledback while resource objects 262 and 263 have committed) then resource object 231 would throw back the HeuristicMixed exception to the transaction objects 221. This involves the operator of server 26 deciding that its resources 261, 262 and 263 have been tied up by this transaction for an unacceptably long period of time (or, this decision is taken automatically by measuring the length of time during which the resource objects have been placed in the prepared state and comparing the measured time to a preset threshold), so a heuristic decision is taken with respect to resources 261, 262 and 263.

No matter which exception is thrown, control flows to step 46, and the flow proceeds as discussed above.

As an alternative embodiment, the YES branch of step 46 could lead directly to step 44 (doing away with step 47). This would involve sending commit commands to each directly registered resource during phase 2, including the directly registered resource 231 that threw the exception. Although it is not necessary to send a commit command to resource 231 during phase 2, it may be easier from an administrative standpoint to send commit commands to each directly registered resource. Of course, the same can be said for the NO branch of step 46 which could be connected directly to step 45 (bypassing step 48).

By allowing the heuristic_direction variable 32 to be programmable, the invention allows the systems administrator to set this variable to the value (commit or rollback) that is most appropriate for the given type of transaction that is being executed. For example, in the on-line banking area, it is usually considered better to rollback all partially completed transactions, as this avoids the disastrous situation where a customer's bank account is wrongly credited/debited because of a failed transaction. On the other hand, in the on-line order entry area, it is usually considered better to commit all partially complete transactions, as this requires less repetition in terms of collecting customer information in the case of a failed transaction.

I claim:

1. A server for use in a client/server computing system which coordinates the processing of distributed transactions in the client/server computing system, the server comprising:

means for sending requests for votes to each resource which has been called by the server to take part in a distributed transaction;

means for receiving votes from each resource in response to having sent requests for votes;

means for determining whether any of the resources has thrown an exception instead of returning a vote, based on the received votes; and means for assigning a programmed direction to a resource which has thrown an exception as a vote to complete the transaction if it is determined that a resource has thrown an exception instead of returning a vote, wherein the means for assigning consults a configurable variable to determine the programmed direction.

2. The server of claim 1 wherein the assigning of the programmed direction involves one of two options, with a corresponding option being chosen depending on the value of the programmed direction:

(1) assigning a vote of commit if the programmed direction is commit and (2) assigning a vote of rollback if the programmed direction is rollback.

3. The server of claim 1 wherein the exception indicates that a resource cannot determine the status of its subordinate resources.

4. The server of claim 1 wherein the exception indicates that at least one of a resource's subordinate resources has taken an heuristic decision to commit and at least one of a resource's subordinate resources has taken an heuristic decision to rollback.

5. The server of claim 1 wherein the client/server computing system is heterogenous.

6. The server of claim 1 wherein the client/server computing system is object-oriented.

7. The server of claim 6 wherein the client/server computing system conforms to the Common Object Request Broker's Object Transaction Service standard.

8. A method of operating a server for use in a client/server computing system which coordinates the processing of distributed transactions in the client/server computing system, the method comprising steps of:

sending requests for votes to each resource which has been called by the server to take part in a distributed transaction;

receiving votes from each resource in response to having sent requests for votes;

determining whether any of the resources has thrown an exception instead of returning a vote, based on the received votes; and assigning a programmed direction as a vote to a resource which has thrown an exception to complete the transaction if it is determined that a resource has thrown an exception instead of returning a vote, wherein the assigning step consults a configurable variable to determine the programmed direction.

9. The method of claim 8 wherein the assigning of the programmed direction involves one of two options, with a corresponding option being chosen depending on the value of the programmed direction:

(1) assigning a vote of commit if the programmed direction is commit and (2) assigning a vote of rollback if the programmed direction is rollback.

10. A computer program product stored on a computer readable storage medium for, when run on a computer, carrying out a server processing method for use in a client/server computing system which coordinates the processing of distributed transactions, said method comprising steps of:

sending requests for votes to each resource which has been called by the server to take part in a distributed transaction;

receiving votes from each resource in response to having sent requests for votes;

determining whether any of the resources has thrown an exception instead of returning a vote, based on the received votes; and assigning a programmed direction as a vote to a resource which has thrown an exception to complete the transaction if it is determined that a resource has thrown an exception instead of returning a vote, wherein the assigning step consults a configurable variable to determine the programmed direction.

* * * * *